United States Patent [19]

Beaujot

[11] Patent Number: 5,331,907
[45] Date of Patent: Jul. 26, 1994

[54] APPARATUS FOR DEPOSITING SEED AND FERTILIZER

[76] Inventor: Norbert F. Beaujot, Box 123 L, Langbank, Saskatchewan, Canada, S0G 2X0

[21] Appl. No.: 885,450
[22] Filed: May 20, 1992
[51] Int. Cl.$^5$ ............................................. A01C 5/00
[52] U.S. Cl. ..................................... 111/52; 111/186; 111/194; 111/147; 111/80
[58] Field of Search ............. 172/11, 261, 263, 260.5, 172/468, 488, 489, 675, 239, 462, 464, 469, 924, 456; 111/52, 186, 194, 147, 80, 73

[56] References Cited

U.S. PATENT DOCUMENTS

| | | | |
|---|---|---|---|
| 4,417,530 | 11/1983 | Kopecky | 111/186 X |
| 4,506,609 | 3/1985 | Fuss et al. | 111/52 X |
| 4,648,466 | 3/1987 | Baker et al. | 172/260.5 |
| 4,686,914 | 8/1987 | Schaaf et al. | 111/73 |
| 4,762,075 | 8/1988 | Halford | 111/73 |
| 5,025,736 | 6/1991 | Anderson | 111/80 X |
| 5,088,563 | 2/1992 | Shidler | 172/456 |

FOREIGN PATENT DOCUMENTS 1178851  4/1984  Canada.

*Primary Examiner*—Clifford D. Crowder
*Assistant Examiner*—Paul C. Lewis

[57] ABSTRACT

Apparatus for depositing seed and fertilizer in the ground comprises, a sectional frame, a seed supply and a fertilizer supply mounted on the frame, a multiplicity of unique fluid controlled seed row assemblies pivotally mounted on the frame to receive seed and fertilizer from their supplies, a fluid pressure source, a first control means for controlling fluid flowing from the source to the seed row assemblies, an identical second control means for controlling fluid flowing from the source to fluid controlled pivotal sections of the sectioned frame. The unique seed row assemblies including a frame assembly mounting, an elongated draw arm pivotally connected to the frame assembly mounting, a ground engaging assembly fixed to the elongated draw arm, the ground engaging assembly including a mounting arm, a ground engaging fertilizer dispenser pivotally mounted on the arm, a ground engaging seed dispenser adjustably mounted on the arm and a packing/depth gauge wheel rotatably mounted and laterally adjustable on the arm, a two way seed row assembly biasing cylinder and piston assembly pivotally connected to the frame assembly mounting and to the ground engaging fertilizer dispenser to bias the seed row assembly in a working position or to bias the seed row assembly in a transport position.

29 Claims, 6 Drawing Sheets

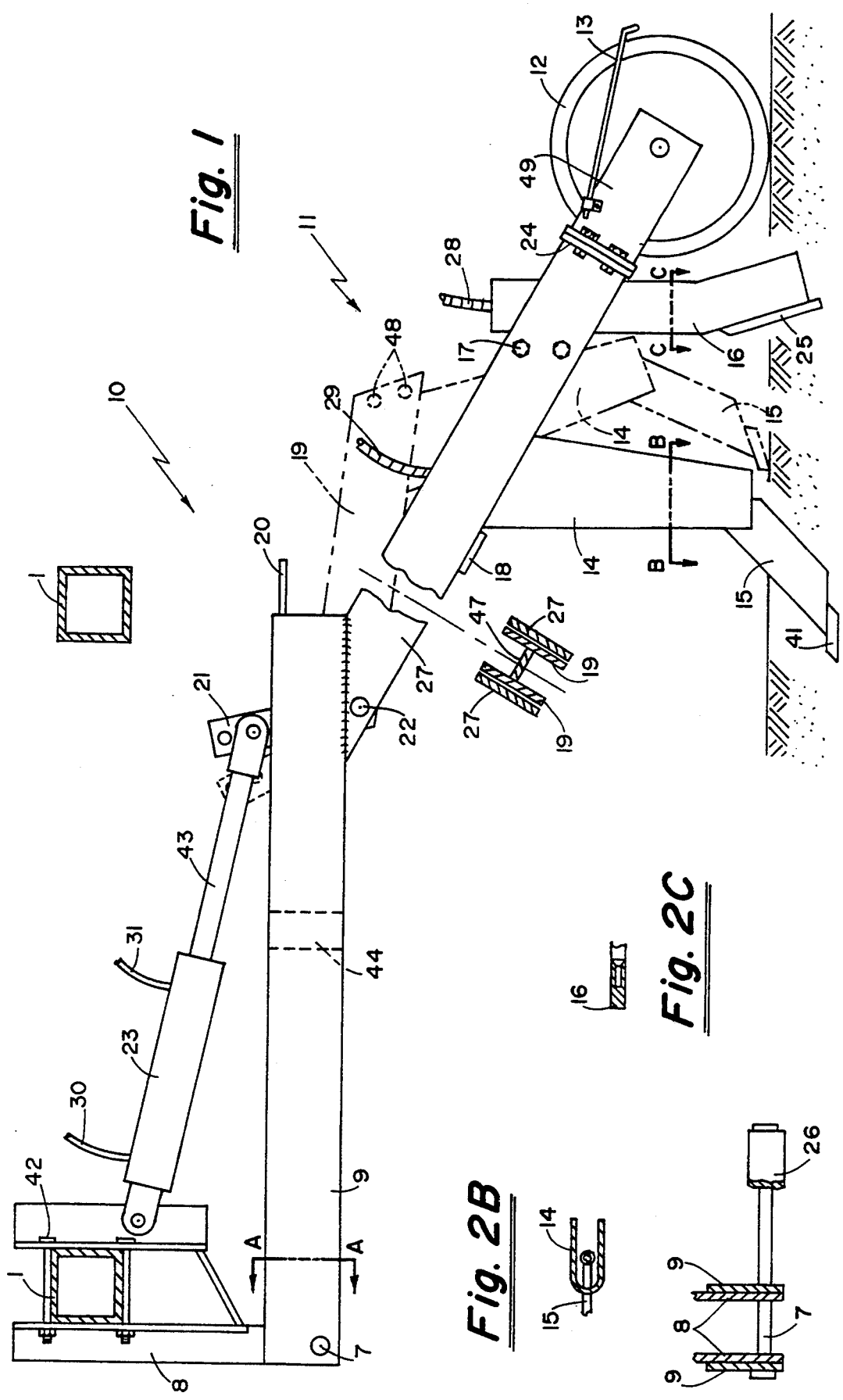

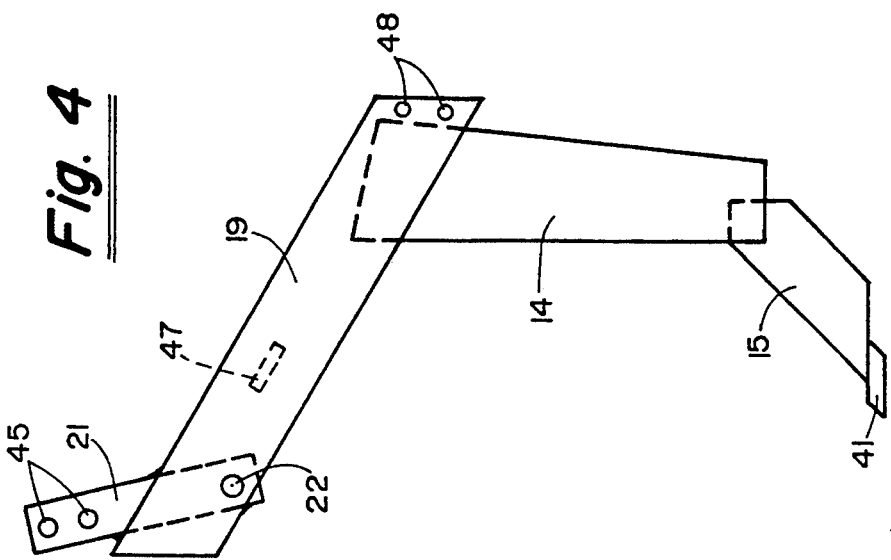
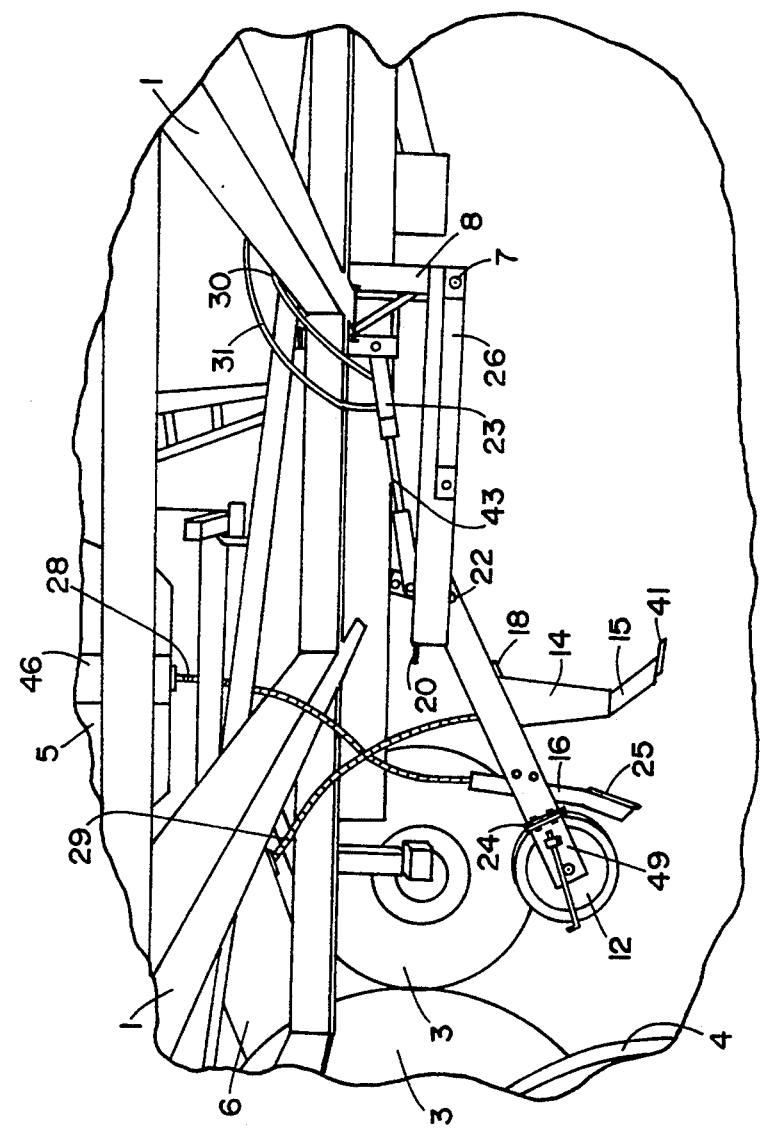

5,331,907

APPARATUS FOR DEPOSITING SEED AND FERTILIZER

This invention relates to a seeding apparatus and in particular a seeding apparatus depositing seed and fertilizer in the ground at a most precise and advantageous location. This apparatus is particularly but not exclusively for use in minimum or zero tillage applications.

BACKGROUND OF THE INVENTION

The planting of seed for the growing of crops has developed from the casting of seed by hand to using disc furrow openers, press drills and packers. The above carried with them the need for a well cultivated soil for a seed bed. With the advent of minimum or zero tillage for seed bed preparation new methods and implements became necessary. The zero tillage evolved to soil conservation and a saving in time and money to make the arming operation competitive. The zero tillage has the disadvantages of heavy previous crop residue and difficult precise penetration of the unworked soil for proper seed and fertilizer deposition.

Several attempts have been made to overcome these disadvantages as seen in U.S. Pat. No. 4,762,075 to Halford U.S. Pat. No. 4,686,914 to Schaaf et al and in Canadian patent 1,178,851 to Dreyer et al. In patent "075" there is disclosed a machine that requires the total machine to be lowered to working position, the operator is required to adjust the packer/depth control wheel of each individual unit by adjusting rods. Applicants machine, implement or apparatus in contrast utilizes a hydraulic system with each seed row assembly having a separate cylinder for depth and packing control fed by a hydraulic source controlled by a combination adjustable pressure and release valve with no lowering or raising of the frame being required.

In patent "914" there is disclosed a seed drill having a hoe bed pivotally attached to a frame and carrying a multiplicity of hoe point means rigidily attached thereto. A single hydraulic piston is provided for depth control of the complete hoe bed. In contradistinction applicants device provides a multiplicity of independent seed row assemblies for dispensing fertilizer and seed and each independent seed row assembly is operated by a separate hydraulic cylinder fed from a hydraulic source controlled by a combination adjustable pressure and release valve.

In Canadian patent "851" there is shown a parallelogram type frame seed row assembly controlled by a spring adjusted by a central adjusting device in the form of a crank handle and a lifting hydraulic cylinder for transporting. Applicants device has separate seed row assemblies made operational by separate hydraulic cylinders which achieve ground penetration and lifting for transport and are fed by a source controlled by a combination adjustable pressure and release valve. It is also to be noted that applicants device deposits the fertilizer before and below the seed.

SUMMARY OF THE INVENTION

According to the present invention there is provided a seeding apparatus comprising, a sectioned transportable frame carrying a seed supply, a fertilizer supply and a multiplicity of innovative and unique seed row assemblies, each assembly being pivotally mounted to the frame. A conveying means carries seed and fertilizer from the supply to each seed row assembly for deposition in the soil. A fluid pressure source feeds first control means controlling the fluid flow that can pivotally bias in two directions the seed row assemblies which are connected in parallel. This first controlled fluid pressure produces a variable control over a packer/depth gauge wheel. An identical second control means controlling fluid from the same fluid pressure source controlling the fluid flow that can pivotally bias in two directions flanking sections of the frame, the biasing means being connected in parallel in both cases.

The unique seed row assembly is comprised of a frame mounting means, an elongated draw arm pivotally connected to the frame mounting means, a ground engaging assembly fixed to the elongated draw arm, the ground engaging assembly including a mounting arm, ground engaging fertilizer dispensing means pivotally mounted thereon, a ground engaging seed dispensing means adjustably mounted thereon and a packing/depth gauge means rotatably and adjustably mounted thereon, two way seed row assembly biasing means pivotally connected to the frame mounting means and to the ground engaging fertilizer dispensing means to bias the seed row assembly in a working position or to bias the seed row assembly in a transport position.

From the above summary it is readily discernible that the primary object of the instant invention is to provide a seeding apparatus that will deposit two separate materials in the soil or ground in a precise and expiditious manner.

It is a further object of this invention to provide a seeding apparatus that requires no vertical movement of the frame.

It is a further object of this invention to provide a seeding apparatus that has a high trash clearance for minimum tillage planting.

It is yet another object of this invention to provide a seeding apparatus that will cause a minimum of soil disturbance.

It is yet a further object of this invention to provide a pivotal winged frame controlled by a combination variable pressure and release valve.

These and other objects of the present invention will become readily apparent as the following description is read in conjunction with the accompanying drawings wherein like reference numerals indicate like elements throughout the several views.

DESCRIPTION OF THE DRAWINGS

FIG. 1 is a sectional side elevation of the seed row assembly showing a possible alternate location of the fertilizer dispensing means during operation.

FIG. 2A shows a section taken at the cutting plane A—A in FIG. 1.

FIG. 2B shows a section taken at the cutting plane B—B in FIG. 1.

FIG. 2C shows a section taken at the cutting plane C—C in FIG. 1.

FIG. 3 is a perspective view of the seeding apparatus with only a single seed row assembly installed for clarity.

FIG. 4 is a side elevation of the ground engaging fertilizer dispensing means.

DETAILED DESCRIPTION OF PREFERRED EMBODIMENT

Figure 5:
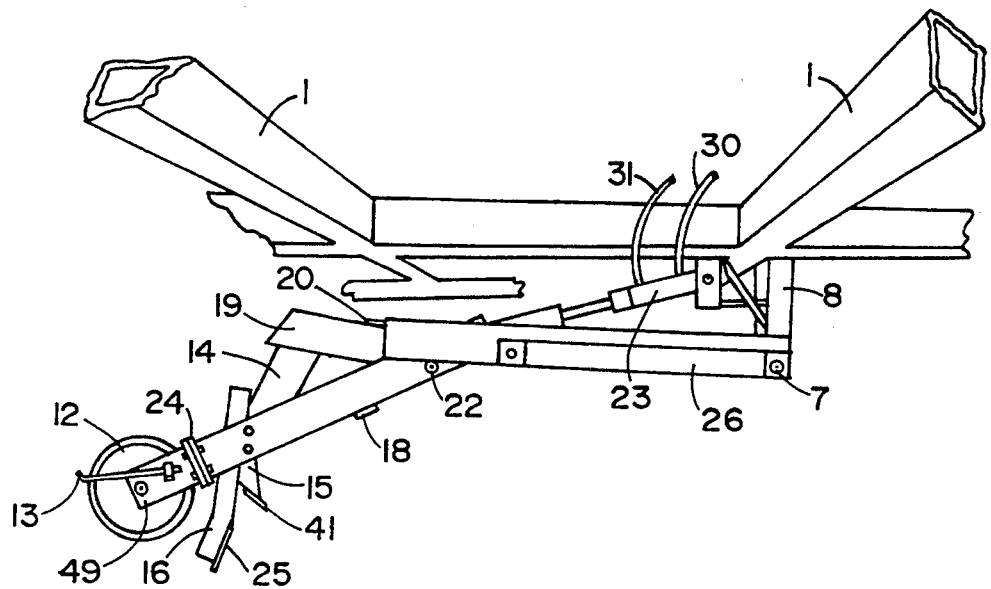
FIG. 5 is a perspective view of the seeding apparatus frame with a single seed row assembly showing the fertilizer dispensing means pivoted and engaging the upper limit stop.

Reference is now made to FIG. 1 in which 10 refers to a seed row assembly which is connected to a portion of the seeding apparatus frame 1. A ground engaging assembly 11 forms a portion of the seed row assembly 10 and carries the ground engaging elements that dispense the seed and fertilizer in the ground and pack the ground. The seed row assembly 10 is clamped to frame 1 by clamp bolts 42 drawing together seed row assembly frame mounting means 8. Pivotally connected to seed row assembly frame mounting means 8 is a two way biasing means in the form of piston-cylinder assembly 23 having two fluid conduit means 30, 31, to be supplied with fluid under pressure to extend or retract the piston rod 43. By moving the mounting locations of the piston-cylinder assembly 23 and adjusting the hydraulic release pressure many combinations of trip force and packing pressure can be achieved to accomodate various types of soil conditions. Pivotally connected to seed row assembly mounting means 8 is a draw arm 9 held by draw arm pivot pin 7. Fixed to draw arm 9 which is generally in the form of two elongated plates, but may take other forms such as a solid arm, made rigid by one or more support boxes 44 is a mounting arm 27 which is also generally but not necessarily formed of two elongated plates. Pivotally mounted on support arm 27 at pivot pin 22 is a fertilizer dispensing assembly more clearly shown in FIG. 4 and including a transfer link 21 which is pivotally connected to piston rod 43 and fixed to shank arm 19, a fertilizer shank 14 adjustably mounted to shank arm 19 and fed by fertilizer hose 29, a furrow knife opener 15 fixed to fertilizer shank 14 and a wear tip 41 fixed a distal end of the knife opener 15. A ⅜" wide furrow knife opener 15 is most commonly used for liquid fertilizer while a ¾ opener is used for granular fertilizer. A coulter wheel could be used in place of the fertilizer shank 14 and furrow knife opener 15 if pressurized liquid fertilizer is to be used. The pressurized fluid of approximately 100 p.s.i. would be injected by nozzles through the slit formed in the ground by the coulter. An upper limit stop 20 is fixed to a distal end of draw arm 9 to limit the upward pivoting movement of the fertilizer dispensing assembly when an obstacle is encountered in the ground. An alternate location of the fertilizer dispensing assembly under such conditions is shown. A reversal of fluid flow in the piston-cylinder assembly 23 will pivot the fertilizer dispenser assembly upwardly until it reaches the upper limit stop 20 at which time further fluid flow in the same direction forces the entire seed row assembly 10 to pivot upwardly until it engages a portion of the frame 1 which position is used for end of the field turning or transportng. The lifting of the seed row assembly 10 into transporting position with tile inherent pivoting of the fertilizer dispensing unit assists in cleaning tile fertilizer hank 14 of grasses and mud accumulated thereon during operation.

Looking further at the ground engaging assembly 10 we see from a removed section of mounting arm 27 and fertilizer shank arm 19 that they are formed of elongated plates and formed into a box type arm by cross supports 47 in the case of shank arm 19, and in the case of mounting arm 27 it is such as the fertilizer shank stop 18. Mounting arm 27 and fertilizer shank arm 19 can also be in the form of solid members. The seed shank 16 is fed by seed hose 28 and is clamped to one side plate of mounting arm 27 by seed shank clamping means 17. This clamp also serves to adjustably hold the seed dispensing means in a precise location. The seed shank 16 is rigid with approximately a 10° slope rearwardly to enable it to glide over obstacles without undue shock loading. A seed shank furrow opener 25 fixed to seed shank 16 adds strength to the seed shank 16 and could have a ground engaging wear resistant tip. At a distal end of mounting arm 27 there is laterally adjustably and rotatably mounted by packer/depth gauge mounting means 49, a packer/depth gauge wheel 12 made of any desirable material and generally circular in form. The packer/depth gauge wheel 12 provides for individual row packing that gives individual seed depth precision and packing pressure uniformity and adjustability to compensate for ground level variations. The total weight of the seeding apparatus can in fact be used for packing the seed rows thereby minimizing compaction by the main flotation wheels 3. A scraper 13 is supported on the packer/depth gauge mounting means 49 and keeps tile face of the packer/depth gauge wheel 12 clean for proper packing. Each seed row assembly 10 is depth controlled by its individual packer/depth gauge wheel 12.

Now referring to FIG. 2A there is shown a section A—A taken in FIG. 1. The section A—A shows two side plates of draw arm 9 pivotally mounted by draw arm pivot pin 7 to seed row assembly mounting 8. A seed row assembly lateral support 26 is partially shown and is more fully shown in FIG. 3. This is provided to maintain precise row spacing and resist twisting due to side forces. FIG. 2B is the section B—B in FIG. 1 clearly showing the rounded forward edge of fertilizer shank 14 which assists in trash clearing and adds considerably to the required strength and rigidity. Comparing the plate separation of fertilizer shank arm 19 to which the shank arm 14 is connected at the top and the section B—B near the bottom we see that the fertilizer shank 14 tapers inwardly on the sides and rear. FIG. 2C shows the section C—C which indicates that the seed shank 16 is quite narrow. The shank 16 is adjustably clamped to a plate of the mounting arm 27 by clamping means 17 and receives seed from seed tube 28. The side mounting of seed shank 16 allows the tapered fertilizer shank 14 to pass by it to some degree before the fertilizer dispensing means engages tile fertilizer shank arm upper limit stop 20.

Figure 7:
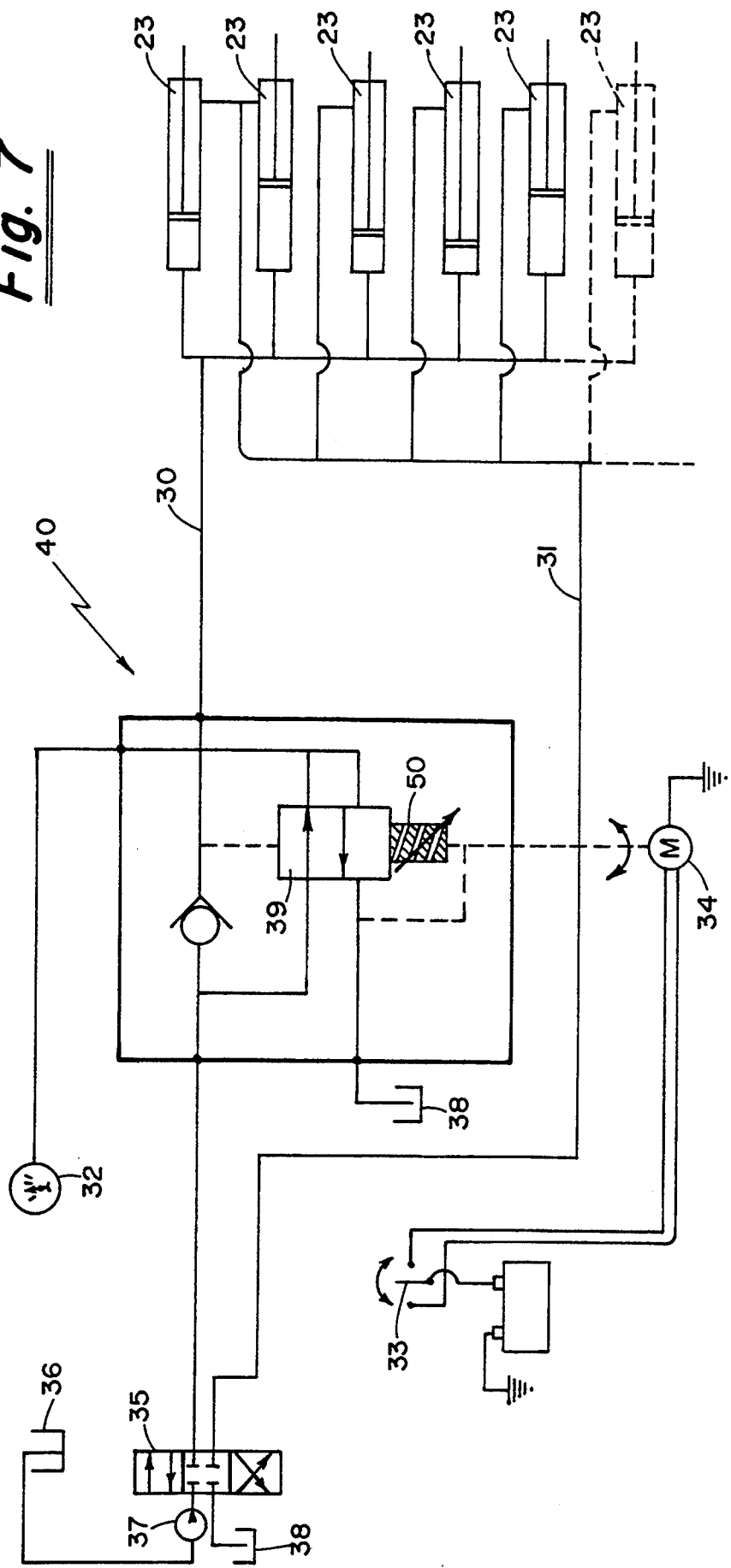
FIG. 7 is a schematic diagram of the fluid source means, and one only of the combination adjustable pressure and release valve with controls and the parallel assembly of seed row assembly operators.

Referring now to FIG. 3 we have a partial perspective seeding apparatus with only 1 seed row assembly 10 in position for the sake of clarity. Conventional air seeders have been using various means of raising and lowering the complete frame of a cultivator unit to place the seed and fertilizer at the desired location. The size of the machine and unevenness of the soil has made it difficult to achieve uniform seed and fertilizer depth and proximity while mail, raining uniform and adequate packing pressure. Applicants seeding apparatus has preferrably a rigid central frame 1 mounted on two large flotation tires 3 with the seed supply 5 and fertilizer supply 6 connected directly thereto. Seed supply 5 and fertilizer supply 6 could also be in the form of towed vehicle containers connected to the frame. Two floating wing frames are pivotally mounted on each end of central main frame 1. Only one wing frame tire 4 has been shown. Wing frames pivotally mounted to the central main frame are common and therefore have been schematically illustrated. However the hydraulic means to raise and lower each wing is new with a floating downward bias system being identical to that operating the hydraulics of the row assemblies 10 as shown in FIG. 7. This can in fact be used to transfer some of the central main frame weight to the wings. The seed metering system 46 is considerably elevated and is generally in front of the seed supply 5. A conventional demand auger (not shown) is used feed the seed up to the metering system 46. This system several obvious advantages such as minimizing the effect of a varying seed supply level, placing the metered seed in a continuous downward sloping seed hose 28 greatly reducing velocity if required and greatly reducing maintenance problems with only a small quantity of grain having to be removed regardless of how full the seed supply 5 is. The fertilizer supply 6 may be in various forms such as liquid or granular but all are fed through fertilizer hose 29 to fertilizer shank 14 and into the ground or soil opened by furrow knife opener 15. When liquid fertilizer is used a pressure pump at supply 6 may be desirable. When granular fertilizer is used a forced air pump may replace the pressure pump. The description of the seed row assembly 10 here shown has been detailed in the description of FIG. 1 and any further description would be considered superfluous.

FIG. 4 has been shown "per se" to give a clearer understanding of the fertilizer dispensing structure. The transfer link 21 is welded or otherwise fixed to the fertilizer shank am 19. Two or more adjustment apertures 45 have been provided to accommodate various soil or other conditions as previously mentioned. Spacer bars 47 may be added to make more rigid and separate, the side plates of the fertilizer shank arm 19 to receive the ">" shaped fertilizer shank which as previously mentioned tapers inwardly from the top downwardly. The fertilizer shank 14 may be fixed to or adjustably mounted on the fertilizer shank arm 19 by bolts 48. At the lower end of fertilizer shank 14 is a fixed furrow knife opener 15 wear tip 41 as previously discussed regarding FIG. 1. This entire fertilizer dispensing assembly is pivoted about pivot pin 22 when the double acting fluid cylinder 23 applies a force to the transfer link 21.

Figure 6:
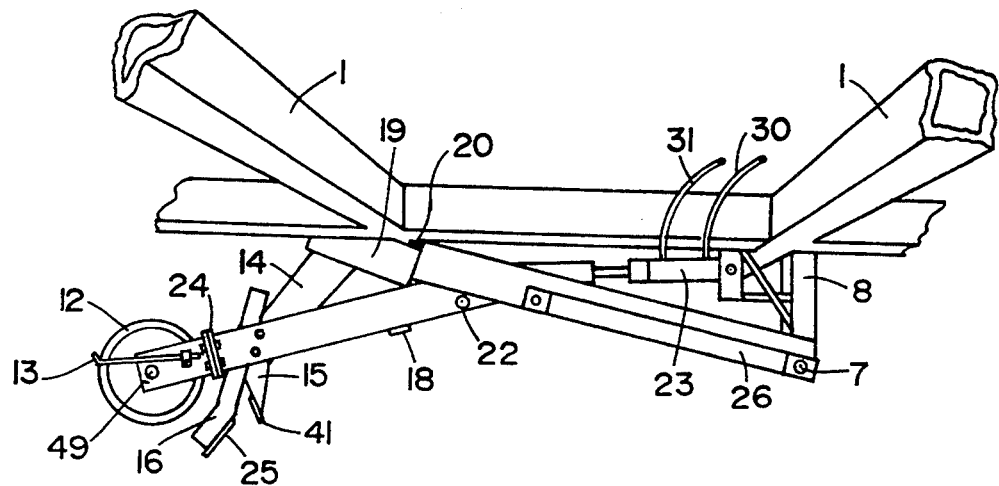
FIG. 6 is a perspective view of the seeding apparatus frame with a single seed row assembly in the transport position abutting the bottom of the frame.

For a view of the seed row assembly 10 in the tripped position and in the transport position we must now look at FIGS. 5 and 6. In FIG. 5 the fertilizer dispensing assembly has been forced rearwardly by extremely hard soil or any other obstacle thereby applying a force to the double acting fluid cylinder 23. The increase in pressure opens the combination adjustable pressure and releasing valve 40 shown in FIG. 7 which causes a drop in pressure thereby allowing the fertilizer dispensing assembly to approach or engage the upper limit stop 20. A low setting on the combination adjustable pressure and releasing valve may release pressure before engagement of upper limit stop 20. When the pressure increasing obstacle has been removed the fertilizer dispensing assembly will return to its normal operating position as the fluid pressure returns to its normal pressure. In FIG. 6 we have a selected applied reversal of fluid pressure flow as set out in FIG. 7. This reversal of pressure on the double acting fluid cylinder 23 raises the fertilizer dispensing assembly until it abuts the upper limit stop 20 then pivots the entire seed row assembly 10 until it engages the frame 1. It is now in transport position. A selected reversal of fluid flow to the double acting fluid cylinder 23 will again place the seed row assemblies 10 in the operating position.

Now referring to FIG. 7 there is shown a fluid main supply 36 which supplies a supply pump 37 connected to a selective three position four way valve 35. From valve 35 there is provided a return to a sump 38 connected to the main supply source 36. Out of valve 35 comes a pressure supply and a return depending on the selected position of valve 35. A pressure relief valve or bypass could be provided for the pump 37 to avoid undue pressure when the valve 35 is in the neutral position. As shown in the schematic diagram a combination variable pressure and release valve 40 is in the fluid line 30 applying pressure to the double acting fluid cylinders 23 on all the seed row assemblies 10 which places each seed row assembly 10 in a normal operating position. A return fluid line 31 is shown to allow fluid displaced by the pistons to return to the sump 38. The man supply 36, the pump 37, the three position four way valve 35, the sump 38, the battery operated reversing switch 33, the fluid pressure read out gauge 32, the reversible motor 34 and the combination variable pressure and release valve are all normally located on the vehicle towing the seeding apparatus or on the seeding apparatus itself. The reversing switch 33 reverses the rotation of reversible motor 34 to increase or decrease the releasing pressure at variable pressure resistance 50. An increased pressure from an obstacle activated fertilizer dispensing means double acting fluid cylinder 23 can be released to sump 38, through control valve 39 with a subsequent return to normal operating position when the obstacle is cleared. When the transport position of the seed row assemblies is desired a reversal of fluid pressure in lines 30 and 31 is required. The valve 35 is selected so that line 31 provides fluid pressure to the opposite side of the piston in the double acting fluid cylinders 23, the excess fluid being forced out along fluid line 30 to sump 38.

Figure 8:
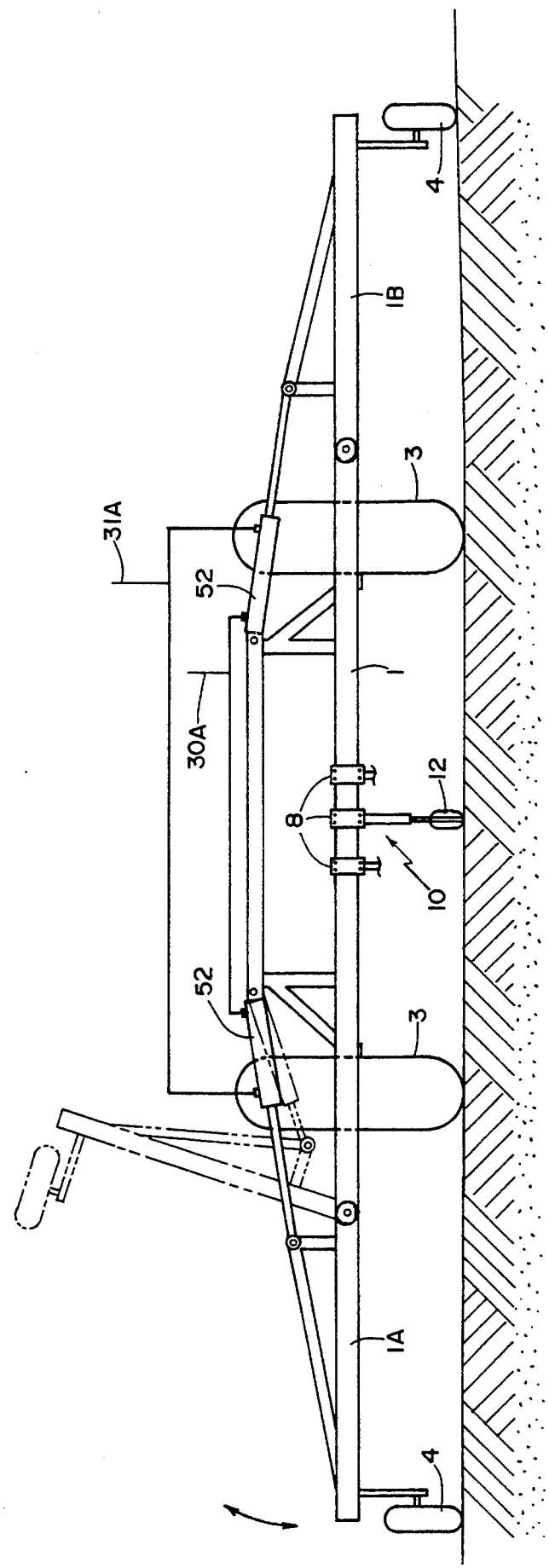
FIG. 8 is a schematic front elevation of the implement frame including a central frame with first and second pivotal wing frames attached thereto.

Now referring to FIG. 8 there is shown a central main frame with pivotal wing frames 1A and 1B supported by wing frame tires 4 and main flotation tires 3. The wing frames 1A and 1B are pivotally controlled by an identical system as shown in FIG. 7 with the fluid lines 30 and 31 being replaced by fluid lines 30A and 31A. These fluid lines activate the two double acting hydraulic cylinders 52 which are each attached to the central main frame 1 and to one of the wing frames 1A and 1B. The wing frame 1A has been shown in an alternate pivoted position for travel. Wing frame 1B can be provided to a like position. One seed row assembly 10 only has been illustrated for the sake of clarity but several would be positioned along all the frames in a manner shown by mounting means 8. The identical system of FIG. 7 with its combination variable pressure and release valve 40 maintains a weight transfer to the wing frames 1A and 1B in field operating position leaving wings flexible to adjust to uneven terrain.

Figure 9:
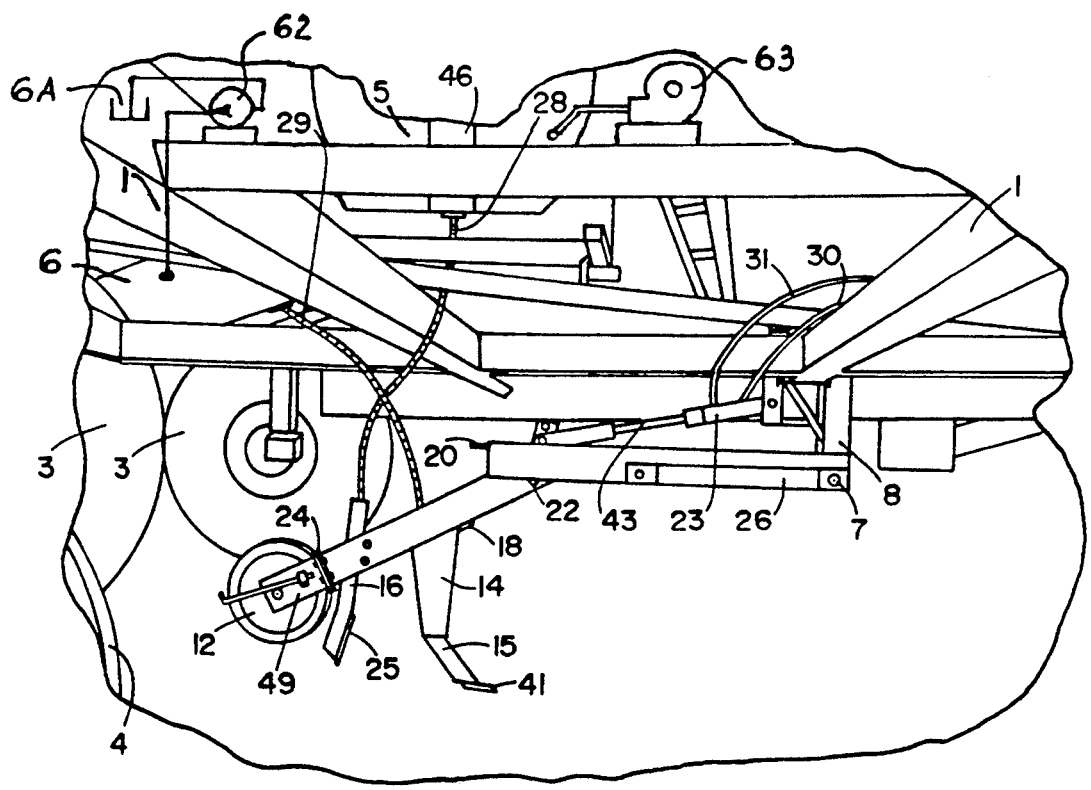
FIG. 9 is a perspective view of the seeding apparatus indicating an air pump applied to the seed supply and a hydraulic pump applied to the fertilizer supply.

The FIG. 9 drawing teaches the application to FIG. 3 of a pressurized liquid fertilizer supply system and a pressurized air system for seed supply. A fluid fertilizer source 6A provides liquid fertilizer to a liquid pressure pump 62 which feeds a liquid fertilizer supply 6. An air pump 63 provides pressurized air to the seed supply 5 to assist in carrying it to seed shank 16. The pressure systems are mounted on frame 1.

Figure 10:
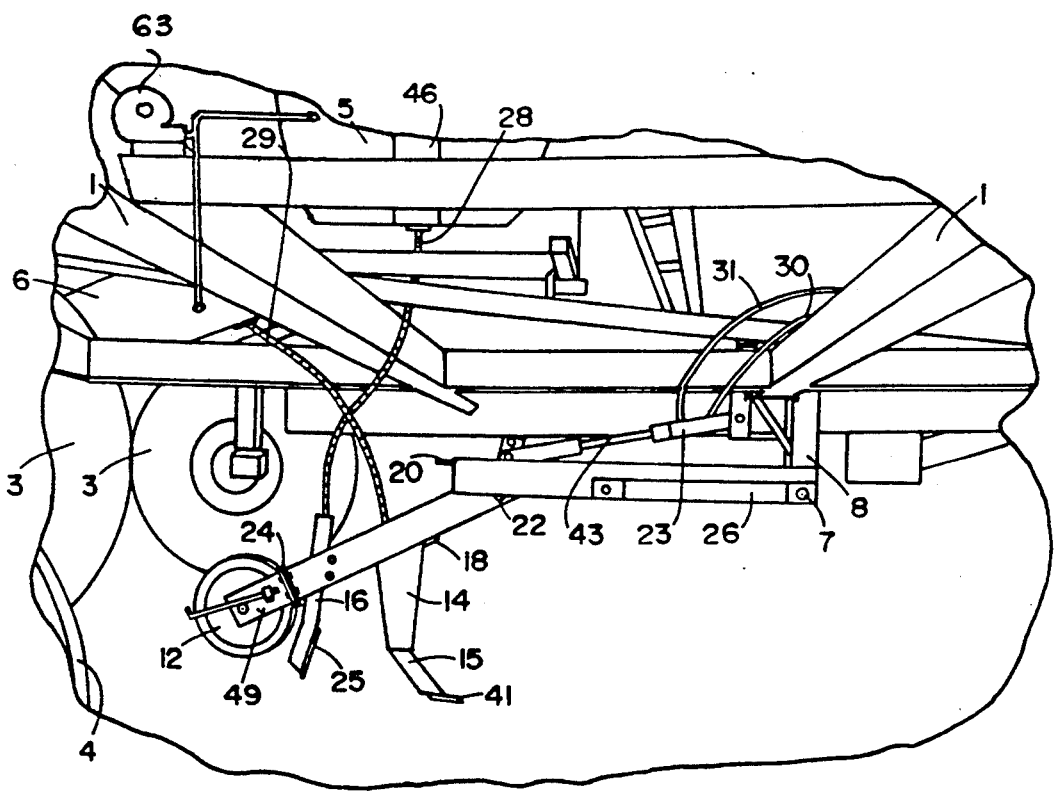
FIG. 10 is a perspective view of the seeding apparatus indicating an air pump applied to the seed supply and the fertilizer supply.

The FIG. 10 drawing teaches again the application of pressure means to the fertilizer and seed supply system as shown in FIG. 3. This present application is required when granular fertilizer is to be used. Again an air pump 63 is mounted on main frame 1. The pump 63 supplies pressurized air carried by two conduits to fertilizer supply 6 and seed supply 5.

Various modifications such as size, shape and arrangement of components may be made without departing from the spirit and scope of the invention. The above disclosure shall be interpreted as illustrative only and limited only by the scope of the invention as defined in the following claims.

What I claim is:

1. A seeding apparatus for applying seed and fertilizer to the ground comprising in combination, a frame means including a central frame, a first wing frame pivotally connected to a first side of said central frame, a second wing frame pivotally connected to a second side of said central frame, a seed supply means mounted on said central frame, a fertilizer supply means mounted on said central frame, wheels attached to said central frame and to said first and second wing frames to support and assist in transporting said seeding apparatus over the ground, a fluid pressure source means mounted on said frame means, frame biasing means pivotally connected to said central frame and to said first and second wing frames and operated by said fluid pressure source means to groundwardly bias said first and second wing frames simultaneously and to pivot said first and second wing frames to a substantially vertical position for travel, a combination adjustable pressure and release valve connected to said fluid pressure source and to said frame biasing means for controlling fluid flow between said fluid pressure source means and said frame biasing means, multiple seed row assemblies separately pivotally connected to said central frame and to said first and second wing frames to deposit and pack seed from said seed supply means and fertilizer from said fertilizer supply means in the ground, each seed row assembly of said multiple seed row assemblies including a frame mounting means, an elongated draw arm pivotally connected to said frame mounting means, a ground engaging assembly fixed to said elongated draw arm, said ground engaging assembly including a mounting arm, a ground engaging seed dispensing means adjustably mounted thereon, a ground engaging fertilizer dispensing means pivotally mounted thereon so that it pivots relative to said seed dispensing means and a laterally adjustable packing and depth gauge means rotatably mounted thereon, a seed row fluid biasing means included in each seed row assembly and pivotally connected to said frame mounting means and to said ground engaging fertilizer dispensing means to operatively bias said seed row assembly groundwardly, a further combination adjustable pressure and release valve connected to and controlling fluid flow between, said fluid pressure source means and said seed row fluid biasing means, a seed conveying means and a fertilizer conveying means carrying seed and fertilizer to said ground engaging seed dispensing means and said ground engaging fertilizer dispensing means respectively from said seed supply means and said fertilizer supply means whereby optimum seed and fertilizer ground depth and placement are achieved while maintaining a uniform and adequate packing pressure.

2. A seeding apparatus as claimed in claim 1, wherein said wheels attached to said central frame include large flotation tires to properly carry the seed and fertilizer supply and wherein said frame biasing means to operate said first and second wing frames simultaneously and said seed row biasing means, to operate said multiple seed row assemblies simultaneously are double acting cylinder-piston assemblies.

3. A seeding apparatus as claimed in claim 1 wherein said seed row fluid biasing means is a dual biasing means in the form of a double acting cylinder-piston assembly whereby all seed row assemblies may be groundwardly biased for working or upwardly biased for transport with no frame movement.

4. A seed row assembly to be mounted on a planting apparatus having a frame comprising in combination, frame mounting means, an elongated draw arm pivotally connected to said frame mounting means, a ground engaging assembly fixed to said elongated draw arm, said ground engaging assembly including a mounting arm, a ground engaging seed dispensing means adjustably mounted on said mounting arm, a ground engaging fertilizer dispensing means pivotally mounted on said mounting arm for pivotal movement relative to said ground engaging seed dispensing means and a packing and depth gauge means mounted on said mounting arm, a double acting seed row biasing means pivotally connected between said frame mounting means and said pivotally mounted ground engaging fertilizer dispensing means, a first action of said double acting biasing means biasing said seed row assembly groundwardly, a second action of said double acting biasing means pivoting said ground engaging fertilizer dispensing means upwardly, whereby optimum seed and fertilizer ground depth and placement are achieved while maintaining uniform and adequate packing pressure.

5. A seed row assembly as claimed in claim 4 wherein said ground engaging fertilizer dispensing means includes an integral transfer link and fertilizer shank arm, a fertilizer shank adjustably mounted on said fertilizer shank arm, said fertilizer shank having mounted on a distal end thereof a knife furrow opener, and wherein it is said transfer link of said ground engaging fertilizer dispensing means that is pivotally connected to said biasing means.

6. A seed row assembly as claimed in claim 4 wherein said ground engaging seed dispensing means includes a seed shank adjustably held by a seed shank clamp, a distal end of said seed shank sloping rearwardly opposite a direction of travel and faced with a seed shank furrow opener.

7. A seed row assembly as claimed in claim 4 wherein said packing and depth gauge means is a wheel rotatably mounted on said ground engaging assembly at a distal end thereof.

8. A seed row assembly as claimed in claim 7 wherein said frame mounting means clampingly engages said frame.

9. A seed row assembly as claimed in claim 8 wherein said seed row biasing means is a fluid operated cylinder and piston.

10. A seed row assembly as claimed in claim 9 wherein said packing and depth gauge means is adjustable laterally relative to said mounting arm.

11. A seed row assembly as claimed in claim 10 further including a lateral support fastened to a side of said elongated draw arm and to said frame.

12. A combined planting and fertilizing apparatus comprising in combination, a frame means supported and transportable on a ground surface, a seed supply means connected to said frame means, fertilizer supply means connected to said frame means for fertilizing said seed, multiple seed row assemblies each one pivotally connected to said frame means to deposit and pack said seed and said fertilizer beneath the ground surface, conveying means to carry said seed and said fertilizer from said seed supply means and said fertilizer supply means respectively to each seed row assembly of said multiple seed row assemblies, fluid pressure source means, a first control means for controlling said fluid pressure source means, seed row assembly biasing means groundwardly biasing and included in, each said seed row assembly biasing means being connected to and operated by said controlled fluid pressure source means, every seed row assembly of said multiple seed row assemblies includes a frame mounting means, an elongated draw arm pivotally connected to said frame mounting means, a ground engaging assembly fixed to said elongated draw arm, said ground engaging assembly including a mounting arm, a ground engaging seed dispensing means adjustably mounted thereon, a ground engaging fertilizer dispensing means pivotally mounted thereon so that it pivots relative to said seed dispensing means and a packing and depth gauge means rotatably and adjustably mounted thereon, said seed row assembly biasing means pivotally connected to said frame mounting means and to said pivotally mounted ground engaging fertilizer dispensing means thereby biasing each of said seed row assemblies groundwardly.

13. A combined planting and fertilizing apparatus as claimed in claim 12 wherein said ground engaging fertilizer dispensing means includes an integral transfer link and fertilizer shank arm, a fertilizer shank adjustably mounted on said fertilizer shank arm, said fertilizer shank having mounted on a distal end thereof a knife furrow opener and wherein it is said transfer link of said ground engaging fertilizer dispensing means that is pivotally connected to said seed row biasing means.

14. A combined planting and fertilizing apparatus as claimed in claim 12 wherein said ground engaging seed dispensing means includes a seed shank adjustably held by a seed shank clamp, a distal end of said seed shank sloping rearwardly opposite a direction of travel and faced with a seed shank furrow opener.

15. A combined planting and fertilizing apparatus as claimed in claim 12 wherein said packing and depth gauge means is a wheel laterally adjustable and rotatably mounted on said ground engaging assembly at a distal end thereof.

16. A combined planting and fertilizer apparatus as claimed in claim 12 wherein said seed row assembly biasing means includes on each seed row assembly of said multiple seed row assemblies a double acting fluid operated cylinder and piston assembly and wherein said first control means includes a combination adjustable pressure and release valve controlling the fluid flow between said fluid pressure source means and all of said cylinder and piston assemblies of said multiple seed row assemblies, all of said cylinder and piston assemblies of said multiple seed row assemblies being fed in a simultaneous manner.

17. A combined planting and fertilizing apparatus as claimed in claim 16 wherein said first control means further includes a reversible motor to adjust said combination adjustable pressure and release valve, said adjustment being made to control the complete release of the seed row assembly biasing means when one or more of said seed row assemblies engages an obstacle.

18. A combined planting and fertilizing apparatus as claimed in claim 17 further including motor control means for said reversible motor and wherein said reversible motor is an electric motor.

19. A combined planting and fertilizing apparatus as claimed in claim 12 wherein said frame means includes a central main frame flanked by two wing frames each being pivotally connected to an opposite side of said central main frame.

20. A combined planting and fertilizing apparatus as claimed in claim 19 wherein both of said two wing frames is pivoted by a frame biasing means connected to and operated by said fluid pressure source means.

21. A combined planting and fertilizing apparatus as claimed in claim 20 wherein said frame biasing means includes a double acting cylinder and piston assembly on each said wing frames and wherein said frame biasing means further includes a second control means including a combination adjustable pressure and release valve controlling fluid flow between said fluid pressure source means and both of said frame biasing means, both said frame biasing means being fed in a simultaneous manner.

22. A combined planting and fertilizing apparatus as claimed in claim 12 wherein said fertilizer supply means includes pressurized liquid fertilizer and said seed supply means includes a forced air means to assist in conveying the seed.

23. A combined planting and fertilizing apparatus as claimed in claim 12 wherein said fertilizer supply means and said seed supply means include a forced air means to assist in conveying said fertilizer and said seed respectively.

24. A seeding apparatus as claimed in claim 1 wherein said seed supply means includes a forced air feed to assist in conveying the seed and wherein said fertilizer supply means includes a pressurized liquid fertilizer.

25. Apparatus for planting two different materials in the ground comprising a frame adapted for transport across the ground, first material delivery means comprising knife means for cutting a furrow in the ground, means mounting the knife means on the frame and arranged to cut said furrow in the ground as the frame is moved forwardly over the ground, a first tube means, means for supplying a first material to the first tube means, means mounting the first tube means on the knife means at a position immediately rearwardly thereof for depositing said first material into the furrow, second material delivery means comprising a second tube means, means for supplying a second material to the second tube means, and means mounting the second tube means rearwardly and separately from the knife means, said second tube means being adjustable relative to the knife means, said second material delivery means further including means projecting downwardly from a position above the furrow for engaging the ground within the furrow at a position spaced rearwardly of said knife means and including a rearwardly and downwardly angled lower portion so that the second tube means follows in the furrow at said spaced position and engages soil in the furrow, a packer wheel and means mounting the packer wheel rearwardly of said second tube means for following in the furrow behind the second tube means.

26. A seed row assembly to be mounted on a planting apparatus having a frame comprising in combination, a ground engaging assembly adapted to be pivotally mounted to said frame, said ground engaging assembly including a first material dispensing means and a second material dispensing means, said first material dispensing means being pivotally mounted relative to said second material dispensing means and including a furrow opening knife means, a pivotable shank supporting said furrow opening knife means and a first material conveying means having a lower portion thereof protectively shrouded by said pivotable shank so that said first material is placed in a furrow formed by said furrow opening knife means, said second material dispensing means is rearwardly spaced from said first material dispensing means, said second material dispensing means including an adjustable shank offset from a path travelled by said first material dispensing means, a packer wheel mounted rearwardly of said second material dispensing means, said first material dispensing means occupying said space between said first material dispensing means and said second material dispensing means when said first material dispensing means is pivoted relative to said second dispensing means due to obstacle engagement.

27. A seed row assembly as claimed in claim 26 wherein said adjustable shank carrying said second material includes a lower portion that extends rearwardly and downwardly for obstacle avoidance.

28. A seed row assembly as claimed in claim 26 wherein said pivotable shank is tapered inward from the top downwardly and is formed of a ">" cross section for said protective shrouding.

29. An apparatus for planting two different materials in the ground as claimed in claim 25 wherein said means mounting said knife means includes ">" shaped protective shank pivotally mounted relative to said second material delivery means.

* * * * *